United States Patent
Bang

(10) Patent No.: US 12,319,337 B1
(45) Date of Patent: Jun. 3, 2025

(54) STEERING COLUMN OF VEHICLE AND STEERING SYSTEM OF VEHICLE INCLUDING SAME

(71) Applicant: HL Mando Corporation, Pyeongtaek-si (KR)

(72) Inventor: Gwisik Bang, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/814,153

(22) Filed: Aug. 23, 2024

(30) Foreign Application Priority Data

Apr. 11, 2024 (KR) .......................... 10-2024-0048498

(51) Int. Cl.
*B62D 1/184* (2006.01)
*B62D 1/185* (2006.01)
*B62D 1/19* (2006.01)

(52) U.S. Cl.
CPC ............. *B62D 1/184* (2013.01); *B62D 1/185* (2013.01); *B62D 1/192* (2013.01)

(58) Field of Classification Search
CPC ......... B62D 1/184; B62D 1/185; B62D 1/192
See application file for complete search history.

(56) References Cited

U.S. PATENT DOCUMENTS

| | | | |
|---|---|---|---|
| 2018/0009463 A1* | 1/2018 | Yoshihara | B62D 1/185 |
| 2019/0161108 A1* | 5/2019 | Kwon | B62D 1/192 |
| 2022/0001914 A1* | 1/2022 | Kakita | B62D 1/185 |
| 2024/0043059 A1* | 2/2024 | Heo | B62D 1/184 |

FOREIGN PATENT DOCUMENTS

| | | | | |
|---|---|---|---|---|
| CN | 216332259 U | * | 4/2022 | ............. B62D 1/184 |
| DE | 102019219112 A1 | * | 6/2020 | ............. B62D 1/184 |
| KR | 10-1939578 B1 | | 1/2019 | |
| KR | 102003364 B1 | | 7/2019 | |
| KR | 10-2020-0070086 A | | 6/2020 | |
| WO | WO-2021049821 A1 | * | 3/2021 | ............. B62D 1/181 |

* cited by examiner

*Primary Examiner* — Drew J Brown
(74) *Attorney, Agent, or Firm* — Seed IP Law Group LLP

(57) ABSTRACT

Provided is a steering column of a vehicle. The steering column is configured such that, in a telescoping operation in a situation in which the steering column collapses, an obstructing member contacts a stop protrusion of a lower column to prevent an upper column from being detached. The amount of extension of the steering wheel is adjusted according to the height or body type of a driver so as to reliably maintain the telescoping operation and enable a smooth steering operation.

20 Claims, 6 Drawing Sheets

STEERING COLUMN OF VEHICLE AND STEERING SYSTEM OF VEHICLE INCLUDING SAME

CROSS REFERENCE TO RELATED APPLICATION

This application claims priority from Korean Patent Application No. 10-2024-0048498, filed on Apr. 11, 2024, which is hereby incorporated by reference for all purposes as if fully set forth herein.

BACKGROUND

Technical Field

Embodiments relate to a steering column configured to enable an energy absorption structure in a vehicle collision and a steering system of a vehicle including the same.

Description of the Related Art

In general, the steering column of a vehicle includes a tilt adjusting device allowing a driver to unlock the steering from a locked state by operating an adjustment lever and then to tilt the steering wheel to a predetermined angle and a telescopic adjusting device allowing the driver to adjust the distance between the steering wheel and the driver by retracting or extending the steering wheel.

Such a steering column includes tilt and telescopic functions, which allow the driver to adjust the tilt angle and the amount of extension of the steering wheel according to the height or body type of the driver, thereby achieving a smooth steering operation.

However, conventional steering columns have the problem that if the steering column collapses in a vehicle collision, the upper column is separated from the lower column in a telescoping operation, thereby making steering impossible.

BRIEF SUMMARY

Various aspects provide a steering column of a vehicle and a steering system of a vehicle including the same. The steering column is configured such that, in a telescoping operation in a situation in which the steering column collapses, an obstructing member contacts a stop protrusion of a lower column to prevent an upper column from being detached. The amount of extension of the steering wheel may be adjusted according to the height or body type of a driver so as to reliably maintain the telescoping operation and enable a smooth steering operation.

According to an aspect, embodiments provide a steering column of a vehicle, the steering column including: a lower column including a support bracket having a through-hole provided in a first axial side such that an adjusting bolt extends therethrough, a guide slit extending axially from a first axial end, a stop protrusion protruding from a first axial side of the guide slit, and a guide recess provided in a second axial side of the support bracket in a longitudinal direction of the guide slit; an upper column coupled to the lower column in a retractable or extensible manner, with a fixing bracket having an axially-provided guide hole being fixed to an outer surface of the upper column to be disposed in the guide slit; a telescope obstructing member coupled to a first side of the fixing bracket to be slidable along the guide hole, and in a telescoping operation, contacting the stop protrusion to prevent the upper column from being detached; and a telescope supporting member including a telescope stopper coupled to a second side of the fixing bracket and movable along the guide recess.

According to an aspect, embodiments provide a steering system of a vehicle, a steering column of the steering system including: a lower column including a support bracket having a through-hole provided in a first axial side such that an adjusting bolt extends therethrough, a guide slit extending axially from a first axial end, a stop protrusion protruding from a first axial side of the guide slit, and a guide recess provided in a second axial side of the support brackets in a longitudinal direction of the guide slit; an upper column coupled to the lower column in a retractable or extensible manner, with a fixing bracket being fixed to an outer surface of the upper column to be disposed in the guide slit; a telescope obstructing member coupled to a first side of the fixing bracket, and in a telescoping operation, contacting the stop protrusion to prevent the upper column 12 from being detached; and a telescope supporting member including a telescope stopper coupled to a second side of the fixing bracket and movable along the guide recess.

According to embodiments, provided are the steering column and the steering system including the same. The steering column is configured such that, in a telescoping operation in a situation in which the steering column collapses, the obstructing member contacts the stop protrusion of the lower column to prevent the upper column from being detached. The amount of extension of the steering wheel may be adjusted according to the height or body type of a driver so as to reliably maintain the telescoping operation and enable a smooth steering operation.

BRIEF DESCRIPTION OF THE SEVERAL VIEWS OF THE DRAWINGS

The above and other objects, features, and advantages of the present disclosure will be more clearly understood from the following detailed description, taken in conjunction with the accompanying drawings, in which.

DETAILED DESCRIPTION

Figure 1:
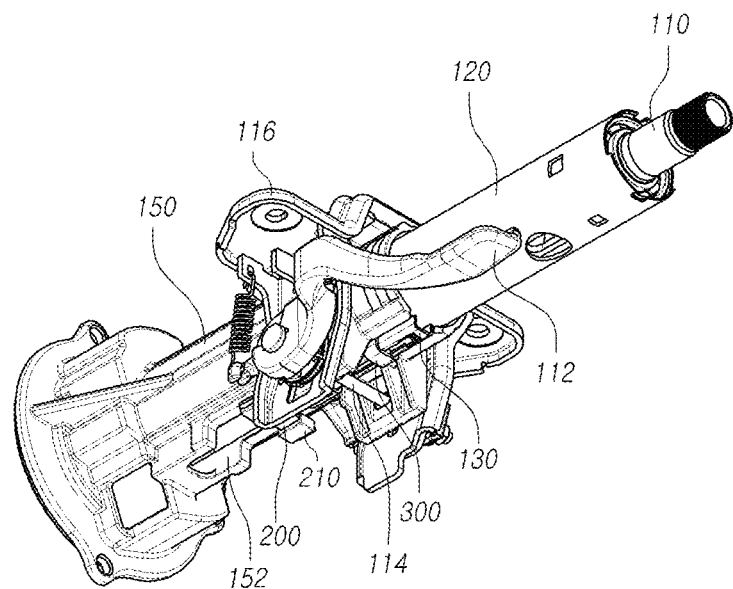
FIG. 1 is a perspective view illustrating a steering column of a vehicle according to embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even if they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the disclosure. Each of these terms is not used to define essence, order, sequence, or number of elements, etc., but is used merely to distinguish the corresponding element from other elements.

When it is mentioned that a first element, for example, "is connected or coupled to" or "contacts or overlaps" a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

The shapes, sizes, dimensions (e.g., length, width, height, thickness, radius, diameter, area, etc.), ratios, angles, number of elements, and the like illustrated in the accompanying drawings for describing the embodiments of the present disclosure are merely examples, and the present disclosure is not limited thereto.

A dimension including size and a thickness of each component illustrated in the drawing are illustrated for convenience of description, and the present disclosure is not limited to the size and the thickness of the component illustrated, but it is to be noted that the relative dimensions including the relative size, location, and thickness of the components illustrated in various drawings submitted herewith are part of the present disclosure.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even if a relevant description is not specified. Further, the term "may" fully encompasses all the meanings of the term "can."

Figure 2:
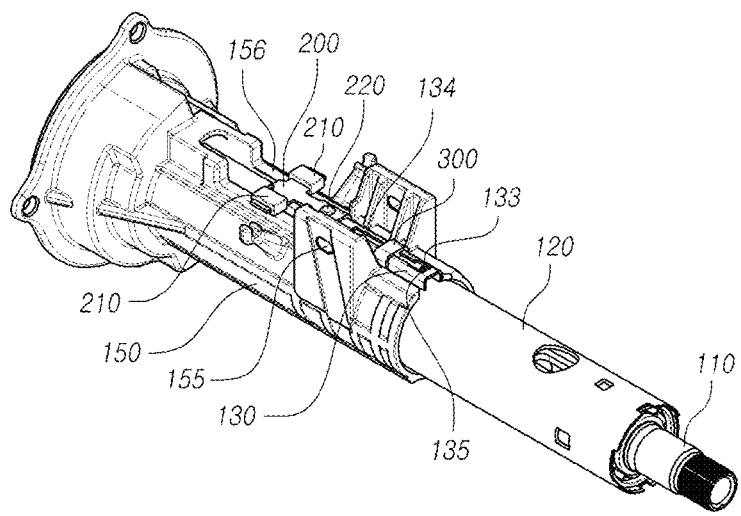
FIG. 2 is a perspective view illustrating portions of the steering column of a vehicle according to embodiments.
Figure 3:
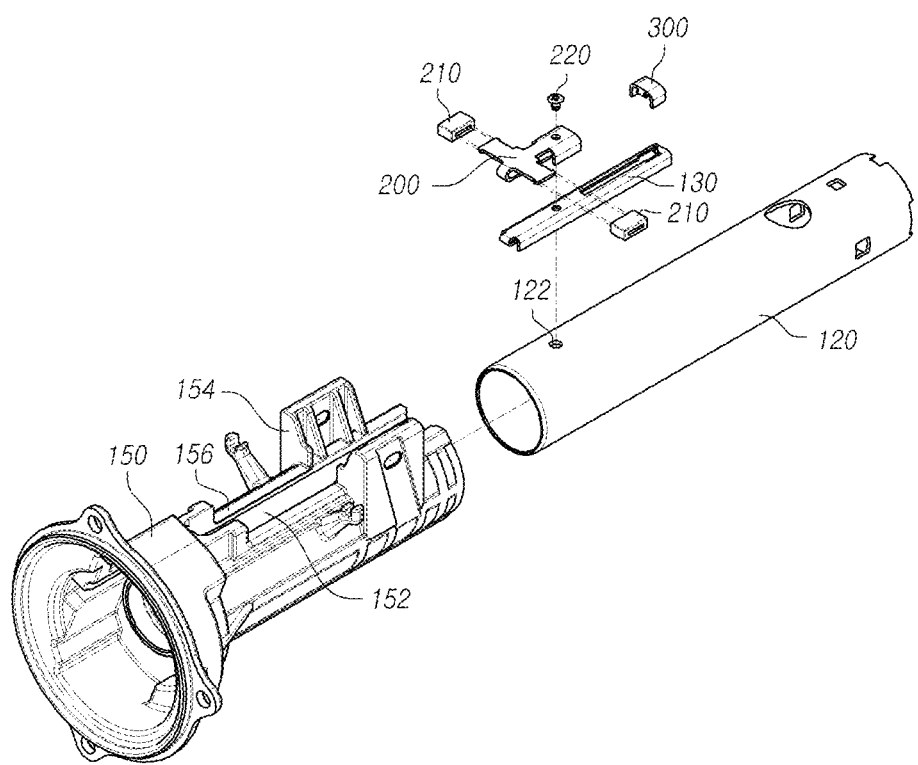
FIGS. 3 to 5 are exploded perspective views illustrating portions of the steering column of a vehicle according to embodiments.
Figure 4:
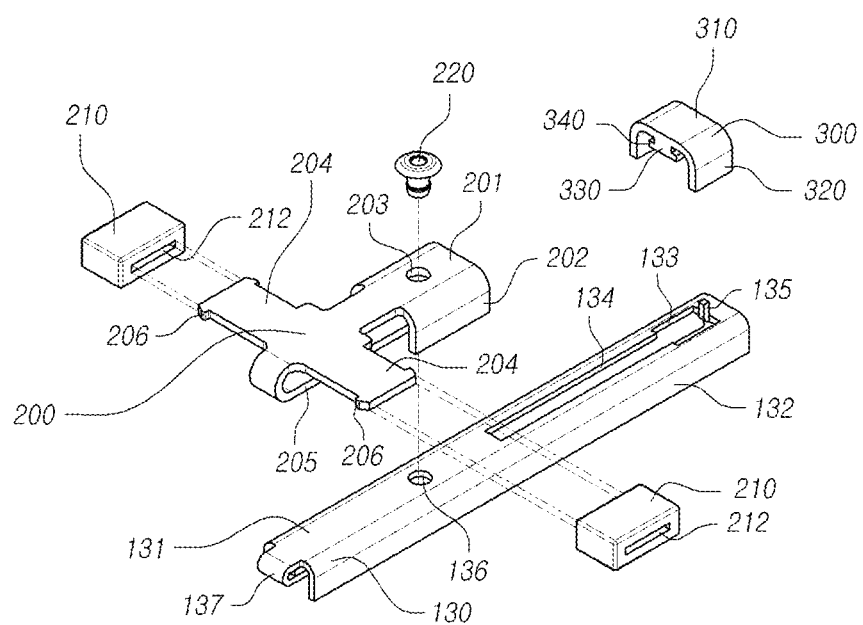
Figure 5:
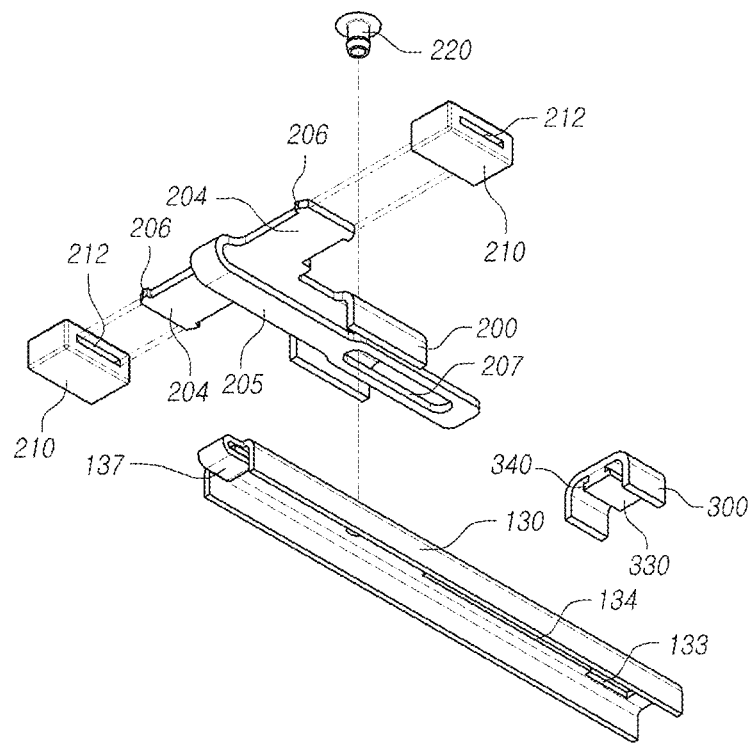
Figure 6:
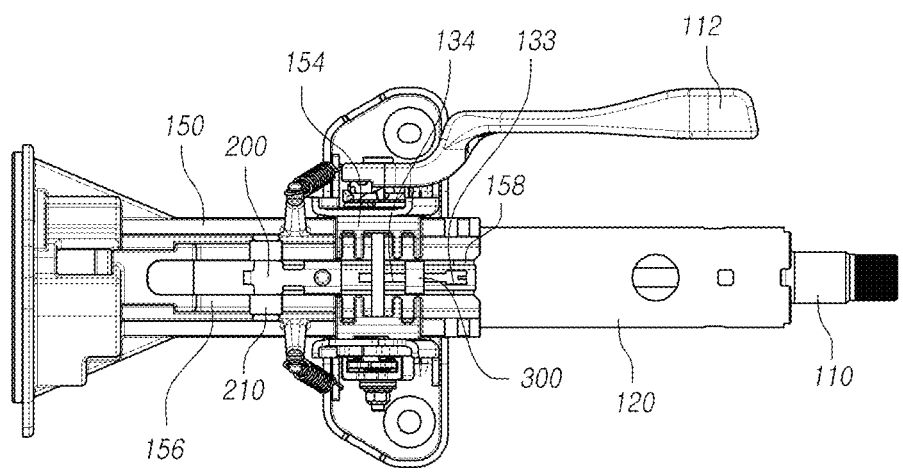
FIG. 6 is a bottom view illustrating the steering column of a vehicle according to embodiments.
Figure 7:
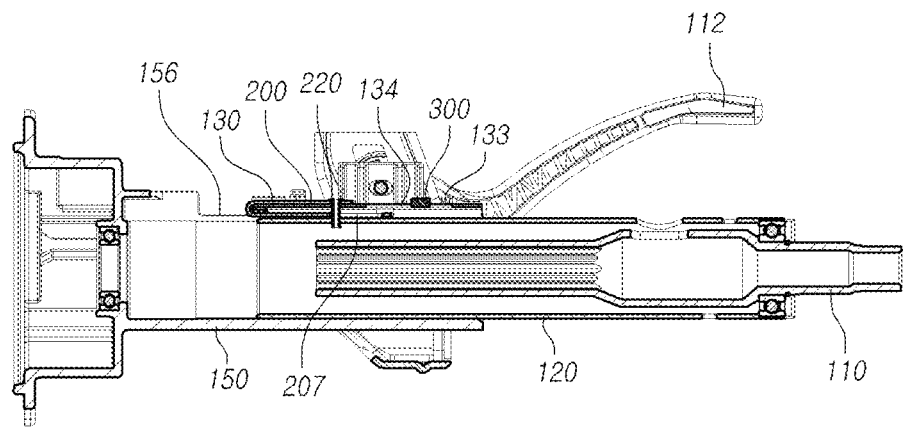
FIG. 7 is a cross-sectional view illustrating the steering column of a vehicle according to embodiments.
Figure 8:
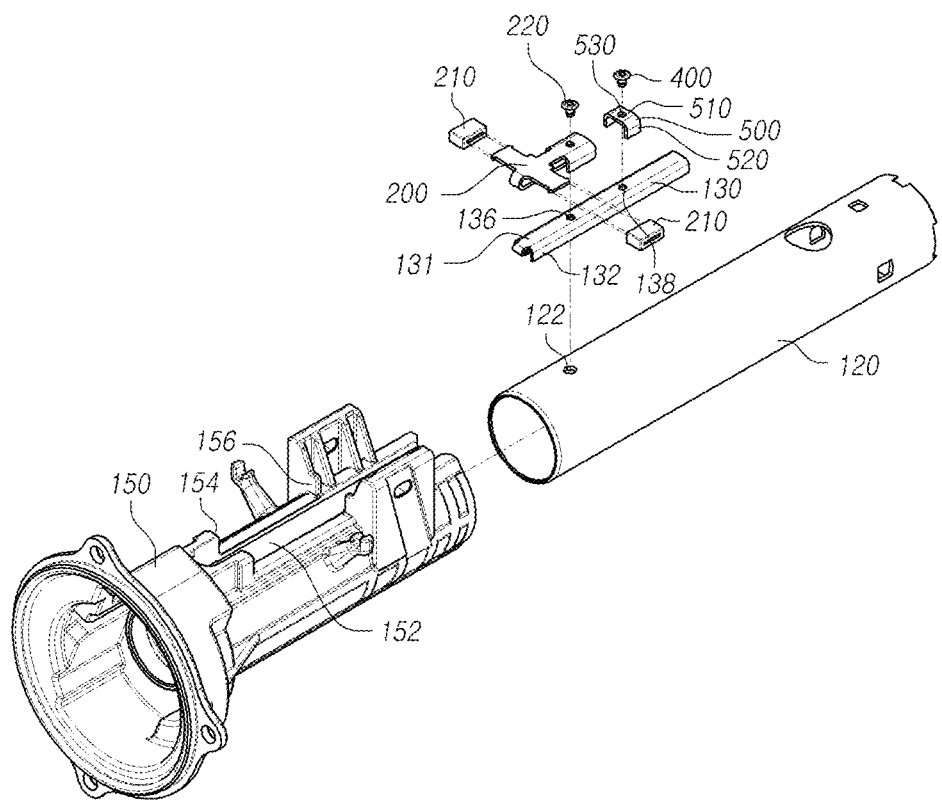
FIG. 8 is an exploded perspective view illustrating a steering column of a vehicle according to other embodiments.
Figure 9:
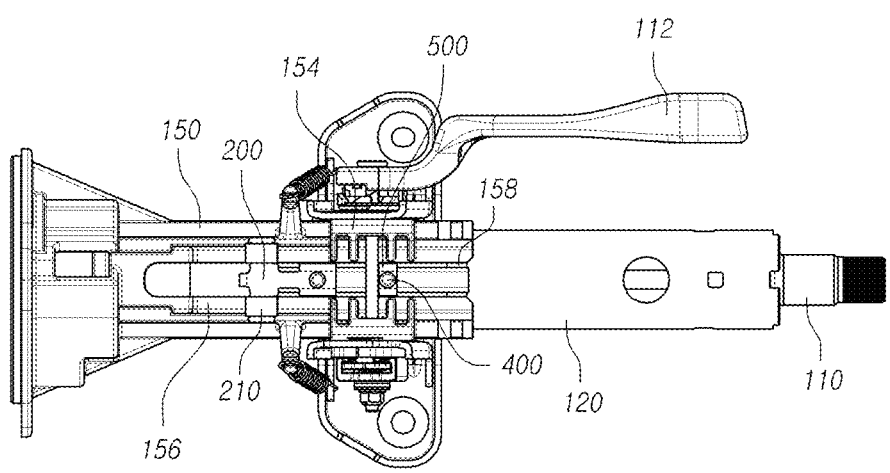
FIG. 9 is a bottom view illustrating the steering column of a vehicle according to other embodiments.

FIG. 1 is a perspective view illustrating a steering column of a vehicle according to embodiments, FIG. 2 is a perspective view illustrating portions of the steering column of a vehicle according to embodiments, FIGS. 3 to 5 are exploded perspective views illustrating portions of the steering column of a vehicle according to embodiments, FIG. 6 is a bottom view illustrating the steering column of a vehicle according to embodiments, FIG. 7 is a cross-sectional view illustrating the steering column of a vehicle according to embodiments, FIG. 8 is an exploded perspective view illustrating a steering column of a vehicle according to other embodiments, and FIG. 9 is a bottom view illustrating the steering column of a vehicle according to other embodiments.

As shown in FIGS. 1 to 7, the steering column of a vehicle according to embodiments includes a lower column 150, an upper column 120, a telescope obstructing member 300, and a telescope supporting member 200. The lower column 150 includes support brackets 154 each having a through-hole 155 provided in a first axial side such that an adjusting bolt 114 extends therethrough, a guide slit 152 extending axially from a first axial end, a stop protrusion 158 protruding from a first axial side of the guide slit 152, and a guide recess 156 provided in a second axial side of the support brackets 154 in the longitudinal direction of the guide slit 152. The upper column 120 is coupled to the lower column 150 in a retractable or extensible manner, with a fixing bracket 130 having an axially-provided guide hole 134 being fixed to an outer surface of the upper column 120 to be disposed in the guide slit 152. The telescope obstructing member 300 is coupled to a first side of the fixing bracket 130 to be slidable along the guide hole 134, and in a telescoping operation, contacts the stop protrusion 158 to prevent the upper column 120 from being detached. The telescope supporting member 200 includes telescope stoppers 204 coupled to a second side of the fixing bracket 130 and movable along the guide recess 156.

The steering column of a vehicle according to the present embodiments is a vehicle steering column in which the upper column 120 inserted into and coupled to the lower column 150 is able to move telescopically in the axial direction, and has a structure in which the upper column 120 collapses toward the lower column 150 to absorb collision energy in the event of a vehicle collision.

A mounting bracket 116 is mounted to a vehicle body, and supports the lower column 150 described later.

The steering column of a vehicle is configured so that a driver may operate and unlock an adjustment lever 112, tilt the steering wheel to a predetermined angle, and adjust the distance between the steering wheel and the driver by extending or retracting the steering wheel.

The lower column 150 is provided as a hollow shape surrounding the upper column 120 to allow the upper column 120 to slide axially in a telescoping operation.

In the lower column 150, the support brackets 154 are provided on the first axial side parallel to the axial direction at predetermined intervals, the guide slit 152 is provided to extend axially from the first axial end between the support brackets 154, and the guide recess 156 is provided on the second axial side along the longitudinal direction of the guide slit 152.

Here, in the support brackets 154, the through-hole 155 through which the adjusting bolt 114 extends is provided in each of the support brackets 154 in a direction perpendicular to the axial direction, and the stop protrusion 158 is provided to protrude from the first axial side of the guide slit 152.

The upper column 120 has a hollow shape surrounding a steering shaft 110, and is coupled to the lower column 150 in a retractable or extensible manner.

Here, the fixing bracket 130 in which the guide hole 134 is axially provided is fixed to the outer surface of the upper column 120 so as to be disposed in the guide slit 152, the steering shaft 110 is rotatably coupled to the inner surface of the upper column 120.

The fixing bracket 130 includes: a support plate 131 in which the guide hole 134 is axially provided; and fixing portions 132 bent from the opposite transverse edges of the support plate 131 and coupled to the outer surface of the upper column 120.

The telescope obstructing member 300 is slidably coupled to the first side of the fixing bracket 130, and the telescope supporting member 200 is coupled to the second side of the fixing bracket 130.

The telescope obstructing member 300 is coupled to the first side of the fixing bracket 130 to be slidable along the guide hole 134, and in the telescoping operation, contacts the stop protrusion 158 to prevent the upper column 120 from being detached.

More specifically, the telescope obstructing member 300 includes: a sliding portion 310 supported on the outer surface of the support plate 131 and movable to the first axial side or the second axial side; obstructing portions 320 extending from the opposite transverse edges of the sliding portion 310 to move to the first axial side or the second axial side together with the sliding portion 310 and bent and supported on the fixing portions 132; a guide protrusion 330 inserted into the guide hole 134 and movable along the guide hole 134; and support protrusions 340 extending from the opposite transverse edges of the guide protrusion 330 and supported on the inner surface of the support plate 131.

The sliding portion 310 is supported on the outer surface of the support plate 131 to slide to the first axial side or the second axial side.

The obstructing portions 320 are provided to extend from the opposite transverse edges of the sliding portion 310 to move to the first axial side or the second axial side together with the sliding portion 310, and are bent and supported on the fixing portions 132.

Here, if the upper column 120 is extended during the telescoping operation, the obstructing portions 320 contact the stop protrusion 158 to prevent the upper column 120 from being detached.

The guide protrusion 330 is provided to protrude from the sliding portion 310 toward the support plate 131, and is inserted into the guide hole 134 to move along the guide hole 134.

The support protrusions 340 are provided to extend from the opposite transverse edges of the guide protrusion 330, and are supported on the inner surface of the support plate 131.

Here, the support plate 131 includes: an accommodating portion 133 provided in a first side of the guide hole 134 to be connected to the guide hole 134 so that the support protrusions 340 are fitted thereinto and supported on the inner surface; and an anti-detachment portion 135 protruding from a first side of the accommodating portion 133 toward the guide hole 134 so that the support protrusions 340 remain supported on the inner surface.

The accommodating portion 133 is provided in the first side of the guide hole 134 to be connected to the guide hole 134 so that the support protrusions 340 are fitted thereinto and are supported on the inner surface of the support plate 131.

The anti-detachment portion 135 is provided in the first side of the portion 133 to protrude toward the guide hole 134 so that the support protrusions 340 remain supported on the inner surface of the support plate 131.

In the anti-detachment portion 135 described above, if the support protrusions 340 bent in a direction perpendicular to the axial direction are fitted into the accommodating portion 133 and moved to the second side so as to be supported on the inner surface of the support plate 131, the support protrusions 340 are bent in a direction parallel to the axial direction so as not to be separated by the accommodating portion 133 and to limit axial movement of the telescope obstructing member 300.

According to embodiments described above, in a telescoping operation in a situation in which the steering column collapses, even if a breaking bolt 220 is sheared and the telescope supporting member 200 does not limit the telescopic travel distance, the telescope obstructing member 300 may contact the stop protrusion 158 of the lower column 150 to prevent of the upper column 120 from being detached.

In addition, the telescope supporting member 200 includes: the telescope stoppers 204 coupled to the second side of the fixing bracket 130 and movable along the guide recess 156; and a bend 205 disposed between the support plate 131 and the upper column 120.

More specifically, the telescope supporting member 200 includes: a base plate 201 coupled to the outer surface of the support plate 131; side portions 202 extending from the opposite transverse edges of the base plate 201 and bent and supported on the fixing portions 132; the telescope stoppers 204 extending from the opposite transverse edges of the base plate 201 and movable along the guide recess 156; and the bend 205 extending from a second end of the base plate 201 and bent and disposed between the support plate 131 and the upper column 120.

The base plate 201 is coupled to the outer surface of the support plate 131 by means of the breaking bolt 220.

The side portions 202 are provided to extend from the opposite transverse edges of the base plate 201, and are bent and supported on the fixing portions 132.

The telescope stoppers 204 are provided to extend from the first transverse edge or the opposite transverse edges of the base plate 201, and serve to move along the guide recess 156 and limit the telescope travel distance.

The bend 205 is provided to extend from the second end of the base plate 201, and is bent and disposed between the support plate 131 and the upper column 120.

Here, in a vehicle collision, if the upper column 120 collapses, the bent portion is unfolded due to plastic deformation caused by the pressurized portion 137 of the fixing bracket 130 moving together with the upper column 120, thereby absorbing the impact.

In addition, the fixing bracket 130 includes a fixing hole 136 provided in the second axial side spaced apart a predetermined distance from the guide hole 134 provided in the first axial side, and the telescope supporting member 200 includes: a coupling hole 203 provided in the base plate 201 to correspond to the fixing hole 136; and the breaking bolt 220 coupled to the fixing hole 136 through the coupling hole 203 and fixing the fixing bracket 130 to the telescope supporting member 200.

The fixing hole 136 is provided in the second axial side of the support plate 131 at a predetermined distance from the guide hole 134 provided in the first axial side of the support plate 131, and the breaking bolt 220 which has extended through the coupling hole 203 is coupled to the fixing hole 136.

The coupling hole 203 is provided in the base plate 201 to correspond to the fixing hole 136, and the breaking bolt 220 extends through coupling hole 203 to be coupled to the fixing hole 136.

The breaking bolt 220 extends through the coupling hole 203, is coupled to the fixing hole 136, and fixes the telescope supporting member 200 to the fixing bracket 130.

Here, the breaking bolt 220 coupled to the fastening hole 136 through the coupling hole 203 may also extend through a slit hole 207 and a fastening hole 122.

As shown in FIG. 7, in the event of a vehicle collision, if the upper column 120 and the fixing bracket 130 undergo an axial collapsing movement, the breaking bolt 220 may be plastically deformed to unfold the bent portion of the bend 205, thereby shearing or fracturing to absorb the impact.

Here, the bend 205 includes the slit hole 207 supported on the breaking bolt 220 to guide the axial movement of the upper column 120 so that, in the event of a vehicle collision, plastic deformation of collapsing the upper column 120 toward the lower column 150 and unfolding the bent portion occurs so as to absorb the energy of the collision.

When the steering column of a vehicle according to embodiments is plastically deformed to unfold the bend 205, the breaking bolt 220 moves along the slit hole 207 to guide the axial movement of the upper column 120.

In addition, the fixing bracket 130 includes a pressing portion 137 extending from a second end of the support plate 131 and bent to overlap the support plate 131 to press the bend 205 to guide plastic deformation of the bend 205 if the bend 205 is plastically deformed.

The pressing portion 137 is provided to extend from the second end of the support plate 131, and is bent to overlap the support plate 131.

Here, the pressing portion 137 is disposed between the base plate 201 and the bend 205 to press the bend 205 to plastically deform the bend 205 if collapse occurs.

In addition, the telescope supporting member 200 includes damping members 210 and obstructing protrusions 206. The damping members 210 surround the telescope stoppers 204 and, in a telescoping operation, are elastically deformed and supported on a first surface or a second surface of the guide recess 156. The obstructing protrusions 206 protrude from outer ends of the telescope stoppers 204 to the first axial side or the second axial side to support the damping members 210, respectively, to prevent the damping members from being detached.

The damping members 210 surround the telescope stoppers 204 fitted into the recesses 212, and in the telescoping operation, are supported on the first surface or the second surface of the guide recess 156 so as to be elastically deformed and absorb shock and noise.

For example, when the telescope stoppers 204 move to the first side or the second side and hit the first surface or the second surface of the guide recess 156, the damping members 210 absorb the shock and noise between the telescope stoppers 204 and the guide recess 156.

The obstructing protrusions 206 are provided on the ends of the telescope stoppers 204 and protrude to the first axial side or the second axial side to support the damping members 210 to prevent the damping members 210 from being detached.

According to embodiments described above, in the telescoping operation in a situation in which the steering column collapses, the telescope obstructing members 300 contact the stop protrusion 158 of the lower column 150 to prevent the upper column 120 from being detached. The amount of extension of the steering wheel may be adjusted according to the height or body type of a driver so as to reliably maintain the telescoping operation and enable a smooth steering operation.

As shown in FIGS. 8 and 9, the steering column of a vehicle according to other embodiments includes a lower column 150, an upper column 120, a telescope obstructing member 500, and a telescope supporting member 200. The lower column 150 includes support brackets 154 each having a through-hole 155 provided in a first axial side such that an adjusting bolt 114 extends therethrough, a guide slit 152 extending axially from a first axial end, a stop protrusion 158 protruding from a first axial side of the guide slit 152, and a guide recess 156 provided in a second axial side of the support brackets 154 in the longitudinal direction of the guide slit 152. The upper column 120 is coupled to the lower column 150 in a retractable or extensible manner, with a fixing bracket 130 being fixed to an outer surface of the upper column 120 to be disposed in the guide slit 152. The telescope obstructing member 500 is coupled to a first side of the fixing bracket 130, and in a telescoping operation, contacts the stop protrusion 158 to prevent the upper column 120 from being detached. The telescope supporting member 200 includes telescope stoppers 204 coupled to a second side of the fixing bracket 130 and movable along the guide recess 156.

Other embodiments have the same configuration as the foregoing embodiments, except for the fixing bracket 130 and the telescope obstructing member 500.

The lower column 150 is provided as a hollow shape surrounding the upper column 120 to allow the upper column 120 to slide axially in a telescoping operation.

In the lower column 150, the support brackets 154 are provided on the first axial side parallel to the axial direction at predetermined intervals, the guide slit 152 is provided to extend axially from the first axial end between the support brackets 154, and the guide recess 156 is provided on the second axial side along the longitudinal direction of the guide slit 152.

Here, in the support brackets 154, the through-hole 155 through which the adjusting bolt 114 extends is provided in each of the support brackets 154 in a direction perpendicular to the axial direction, and the stop protrusion 158 is provided to protrude from the first axial side of the guide slit 152.

The upper column 120 has a hollow shape surrounding a steering shaft 110, and is coupled to the lower column 150 in a retractable or extensible manner.

Here, the fixing bracket 130 in which the guide hole 134 is axially provided is fixed to the outer surface of the upper column 120 so as to be disposed in the guide slit 152, the steering shaft 110 is rotatably coupled to the inner surface of the upper column 120.

The fixing bracket 130 includes: a support plate 131 having a bolt fastening hole 138 provided in a first side and a fixing hole 136 provided in a second side at a predetermined distance from bolt fastening hole 138; and fixing portions 132 bent from the opposite transverse edges of the support plate 131 and fixed to the outer surface of the upper column 120.

The telescope obstructing member 500 is coupled to the first side of the fixing bracket 130, and the telescope supporting member 200 is coupled to the second side of the fixing bracket 130.

The telescope obstructing member 500 is coupled to the first side of the fixing bracket 130, and in the telescoping operation, contacts the stop protrusion 158 to prevent the upper column 120 from being detached.

More specifically, the telescope obstructing member 500 includes: a restraining plate 510 supported on the outer surface of the support plate 131 and having a bolt insertion hole 530; obstructing portions 520 extending from the opposite transverse edges of the restraining plate 510 and bent and supported on the fixing portions 132; and a fastening bolt 400 inserted into the bolt insertion hole 530 and fastened to the bolt fastening hole 138.

The restraining plate 510 is supported on the outer surface of the support plate 131, and has the bolt insertion hole 530 through which the fastening bolt 400 extends.

The obstructing portions 520 are provided to extend from the opposite transverse edges of the restraining plate 510, and are bent and supported on the fixing portions 132.

Here, in the telescoping operation, if the upper column 120 is extended, the obstructing portions 520 contact the stop protrusion 158 to prevent the upper column 120 from being detached.

According to other embodiments described above, in a telescoping operation in a situation in which the steering column collapses, even if a breaking bolt 220 is sheared and the telescope supporting member 200 does not limit the telescopic travel distance, the telescope obstructing member 500 may contact the stop protrusion 158 of the lower column 150 to prevent of the upper column 120 from being detached.

In addition, the telescope supporting member 200 includes: the telescope stoppers 204 coupled to the second side of the fixing bracket 130 and movable along the guide recess 156; and a bend 205 disposed between the support plate 131 and the upper column 120.

More specifically, the telescope supporting member 200 includes: a base plate 201 coupled to the outer surface of the support plate 131; side portions 202 extending from the opposite transverse edges of the base plate 201 and bent and supported on the fixing portions 132; the telescope stoppers 204 extending from the opposite transverse edges of the base plate 201 and movable along the guide recess 156; and the bend 205 extending from a second end of the base plate 201 and bent and disposed between the support plate 131 and the upper column 120.

The base plate 201 is coupled to the outer surface of the support plate 131 by means of the breaking bolt 220.

The side portions 202 are provided to extend from the opposite transverse edges of the base plate 201, and are bent and supported on the fixing portions 132.

The telescope stoppers 204 are provided to extend from the first transverse edge or the opposite transverse edges of the base plate 201, and serve to move along the guide recess 156 and limit the telescope travel distance.

The bend 205 is provided to extend from the second end of the base plate 201, and is bent and disposed between the support plate 131 and the upper column 120.

Here, in a vehicle collision, if the upper column 120 collapses, the bent portion is unfolded due to plastic deformation caused by the pressurized portion 137 of the fixing bracket 130 moving together with the upper column 120, thereby absorbing the impact.

In addition, the fixing bracket 130 includes a fixing hole 136 provided in the second axial side spaced apart a predetermined distance from the bolt fastening hole 138 provided in the first axial side, and the telescope supporting member 200 includes: a coupling hole 203 provided in the base plate 201 to correspond to the fixing hole 136; and the breaking bolt 220 coupled to the fixing hole 136 through the coupling hole 203 and fixing the fixing bracket 130 to the telescope supporting member 200.

The fixing hole 136 is provided in the second axial side of the support plate 131 at a predetermined distance from the bolt fastening hole 138 provided in the first axial side of the support plate 131, and the breaking bolt 220 which has extended through the coupling hole 203 is coupled to the fixing hole 136.

The coupling hole 203 is provided in the base plate 201 to correspond to the fixing hole 136, and the breaking bolt 220 extends through coupling hole 203 to be coupled to the fixing hole 136.

The breaking bolt 220 extends through the coupling hole 203, is coupled to the fixing hole 136, and fixes the telescope supporting member 200 to the fixing bracket 130.

Here, the breaking bolt 220 coupled to the fastening hole 136 through the coupling hole 203 may also extend through a slit hole 207 and a fastening hole 122.

As shown in FIG. 7, in the event of a vehicle collision, if the upper column 120 and the fixing bracket 130 undergo an axial collapsing movement, the breaking bolt 220 may be plastically deformed to unfold the bent portion of the bend 205, thereby shearing or fracturing to absorb the impact.

Here, the bend 205 includes the slit hole 207 supported on the breaking bolt 220 to guide the axial movement of the upper column 120 so that, in the event of a vehicle collision, plastic deformation of collapsing the upper column 120 toward the lower column 150 and unfolding the bent portion occurs so as to absorb the energy of the collision.

When the steering column of a vehicle according to other embodiments is plastically deformed to unfold the bend 205, the breaking bolt 220 moves along the slit hole 207 to guide the axial movement of the upper column 120.

In addition, the fixing bracket 130 includes a pressing portion 137 extending from a second end of the support plate 131, and is bent to overlap the support plate 131 to guide plastic deformation of the bend 205 by pressing the bend 205 during plastic deformation of the bend 205.

The pressing portion 137 is provided to extend from the second end of the support plate 131, and is bent to overlap the support plate 131.

Here, the pressing portion 137 is disposed between the base plate 201 and the bend 205 to press the bend 205 to plastically deform the bend 205 if collapse occurs.

In addition, the telescope supporting member 200 includes damping members 210 and obstructing protrusions 206. The damping members 210 surround the telescope stoppers 204 and, in a telescoping operation, are elastically deformed and supported on a first surface or a second surface of the guide recess 156 during the telescoping operation. The obstructing protrusions 206 protrude from outer ends of the telescope stoppers 204 to the first axial side or the second axial side to support the damping members 210, respectively, to prevent the damping members from being detached.

The damping members 210 surround the telescope stoppers 204 fitted into the recesses 212, and in the telescoping operation, are supported on the first surface or the second surface of the guide recess 156 so as to be elastically deformed and absorb shock and noise.

For example, when the telescope stoppers 204 move to the first side or the second side and hit the first surface or the second surface of the guide recess 156, the damping members 210 absorb the shock and noise between the telescope stoppers 204 and the guide recess 156.

The obstructing protrusions 206 are provided on the ends of the telescope stoppers 204 and protrude to the first axial side or the second axial side to support the damping members 210 to prevent the damping members 210 from being detached.

According to other embodiments described above, in the telescoping operation in a situation in which the steering column collapses, the telescope obstructing members 500 contact the stop protrusion 158 of the lower column 150 to prevent the upper column 120 from being detached. The amount of extension of the steering wheel may be adjusted according to the height or body type of a driver so as to reliably maintain the telescoping operation and enable a smooth steering operation.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A steering column of a vehicle, the steering column comprising:
   a lower column comprising:
      a support bracket having a through-hole provided in a first axial side such that an adjusting bolt extends therethrough;
      a guide slit extending axially from a first axial end;
      a stop protrusion protruding from a first axial side of the guide slit; and
      a guide recess provided in a second axial side of the support bracket in a longitudinal direction of the guide slit;
   an upper column coupled to the lower column in either a retractable or extensible manner, with a fixing bracket having an axially-provided guide hole being fixed to an outer surface of the upper column to be disposed in the guide slit;
   a telescope obstructing member coupled to a first side of the fixing bracket to be slidable along the guide hole, and in a telescoping operation, contacting the stop protrusion to prevent the upper column from being detached; and
   a telescope supporting member comprising at least one telescope stopper coupled to a second side of the fixing bracket and movable along the guide recess.

2. The steering column of claim 1, wherein the fixing bracket comprises:
   a support plate in which the guide hole is axially provided; and
   fixing portions bent from opposite transverse edges of the support plate and coupled to the outer surface of the upper column.

3. The steering column of claim 2, wherein the telescope obstructing member comprises:
   a sliding portion supported on an outer surface of the support plate and movable to the first axial side or the second axial side;
   obstructing portions extending from opposite transverse edges of the sliding portion to move to the first axial side or the second axial side together with the sliding portion and bent and supported on the fixing portions; and
   a guide protrusion inserted into the guide hole and movable along the guide hole,
   wherein in the telescoping operation, the obstructing portions contact the stop protrusion to prevent the upper column from being detached.

4. The steering column of claim 3, wherein the telescope obstructing member further comprises support protrusions extending from opposite transverse edges of the guide protrusion and supported on an inner surface of the support plate.

5. The steering column of claim 4, wherein the support plate comprises an accommodating portion provided in a first side of the guide hole to be coupled to the guide hole so that the support protrusions are fitted thereinto and supported on the inner surface of the support plate.

6. The steering column of claim 5, wherein the support plate comprises an anti-detachment portion protruding from a first side of the accommodating portion toward the guide hole so that the support protrusions remain supported on the inner surface of the support plate.

7. The steering column of claim 1, wherein the telescope supporting member comprises:
   a base plate coupled to an outer surface of a support plate;
   side portions extending from opposite transverse edges of the base plate and bent and supported on a fixing portion; and
   the at least one telescope stopper extending from the opposite transverse edges of the base plate and movable along the guide recess.

8. The steering column of claim 7, wherein the telescope supporting member comprises a bend extending from a second end of the base plate and bent and disposed between the support plate and the upper column.

9. The steering column of claim 8, wherein the fixing bracket comprises:
   the guide hole provided in the first axial side; and
   a fixing hole provided in the second axial side spaced apart a predetermined distance from the guide hole, and
   the telescope supporting member comprises:
      a coupling hole provided in the base plate to correspond to the fixing hole; and
      a breaking bolt coupled to the fixing hole through the coupling hole and fixing the telescope supporting member to the fixing bracket.

10. The steering column of claim 9, wherein the bend comprises a slit hole supported on the breaking bolt to guide an axial movement of the upper column so that, in an event of a vehicle collision, plastic deformation of collapsing the upper column toward the lower column and unfolding a bent portion occurs so as to absorb collision energy.

11. The steering column of claim 9, wherein the fixing bracket comprises a pressing portion extending from a second end of the support plate and bent to overlap the support plate to press the bend to guide plastic deformation of the bend in response to the bend being plastically deformed.

12. The steering column of claim 7, wherein the telescope supporting member further comprises damping members surrounding the at least one telescope stopper and, in the telescoping operation, being elastically deformed and supported on a first surface or a second surface of the guide recess during the telescoping operation.

13. The steering column of claim 12, wherein the at least one telescope stopper comprises obstructing protrusions protruding from ends to the first axial side or the second axial side to support the damping members, respectively, to prevent the damping members from being detached.

14. A steering system of a vehicle, the steering system comprising:
- a steering shaft coupled to a steering wheel and a steering column coupled to the steering shaft and attached to a vehicle body, the steering column comprising:
  - a lower column comprising a support bracket having a through-hole provided in a first axial side such that an adjusting bolt extends therethrough, a guide slit extending axially from a first axial end, a stop protrusion protruding from a first axial side of the guide slit, and a guide recess provided in a second axial side of the support brackets in a longitudinal direction of the guide slit;
  - an upper column coupled to the lower column in either a retractable or extensible manner, with a fixing bracket being fixed to an outer surface of the upper column to be disposed in the guide slit;
  - a telescope obstructing member coupled to a first side of the fixing bracket, and in a telescoping operation, contacting the stop protrusion to prevent the upper column from being detached; and
  - a telescope supporting member comprising at least one telescope stopper coupled to a second side of the fixing bracket and movable along the guide recess.

15. The steering system of claim 14, wherein the fixing bracket comprises:
- a support plate having a bolt fastening hole provided in a first side and a fixing hole provided in a second side at a predetermined distance from the bolt fastening hole; and
- fixing portions bent from opposite transverse edges of the support plate and fixed to the outer surface of the upper column.

16. The steering system of claim 15, wherein the telescope obstructing member comprises:
- a restraining plate supported on an outer surface of the support plate and having a bolt insertion hole;
- obstructing portions extending from opposite transverse edges of the restraining plate and bent and supported on the fixing portions; and
- a fastening bolt inserted into the bolt insertion hole and fastened to the bolt fastening hole,
- wherein in the telescoping operation, the obstructing portions contact the stop protrusion to prevent the upper column from being detached.

17. The steering system of claim 15, wherein the telescope supporting member comprises:
- a base plate coupled to an outer surface of the support plate;
- side portions extending from opposite transverse edges of the base plate and bent and supported on the fixing portions; and
- the at least one telescope stopper extending from the opposite transverse edges of the base plate and movable along the guide recess.

18. The steering system of claim 17, wherein the telescope supporting member further comprises a bend provided to extend from a second end of the base plate and bent and disposed between the support plate and the upper column.

19. The steering system of claim 18, wherein the telescope supporting member further comprises:
- a coupling hole provided in the base plate to correspond to the fixing hole; and
- a breaking bolt coupled to the fixing hole through the coupling hole and fixing the telescope supporting member to the fixing bracket.

20. A steering system of a vehicle, the steering system comprising:
- a steering shaft coupled to a steering wheel and a steering column coupled to the steering shaft and attached to a vehicle body, the steering column comprising:
  - a lower column comprising a support bracket having a through-hole provided in a first axial side such that an adjusting bolt extends therethrough, a guide slit extending axially from a first axial end, a stop protrusion protruding from a first axial side of the guide slit, and a guide recess provided in a second axial side of the support bracket in a longitudinal direction of the guide slit;
  - an upper column coupled to the lower column in either a retractable or extensible manner, with a fixing bracket having an axially-provided guide hole being fixed to an outer surface of the upper column to be disposed in the guide slit;
  - a telescope obstructing member coupled to a first side of the fixing bracket to be slidable along the guide hole, and in a telescoping operation, contacting the stop protrusion to prevent the upper column from being detached; and
  - a telescope supporting member comprising at least one telescope stopper coupled to a second side of the fixing bracket and movable along the guide recess.

* * * * *